United States Patent [19]

Mändl et al.

[11] Patent Number: 5,926,258
[45] Date of Patent: Jul. 20, 1999

[54] METHOD OF REPRODUCING TRANSPARENT MASTERS

[75] Inventors: Matthias Mändl, Ammerthal; Wolfgang Keupp, München; Peter Czekal, München; Friedrich Jacob, München, all of Germany

[73] Assignee: AGFA-Gevaert AG, Leverkusen, Germany

[21] Appl. No.: 08/999,376

[22] Filed: Dec. 29, 1997

[30] Foreign Application Priority Data

Jan. 29, 1997 [DE] Germany ............... 197 03 063

[51] Int. Cl.$^6$ .................. G03B 27/72; G03B 27/32
[52] U.S. Cl. .................. 355/71; 355/77; 355/35
[58] Field of Search .................. 355/71, 35, 41, 355/69, 77, 79; 436/63

[56] References Cited

U.S. PATENT DOCUMENTS

| | | | |
|---|---|---|---|
| 5,155,524 | 10/1992 | Oberhardt et al. | 355/71 |
| 5,352,613 | 10/1994 | Tafas et al. | 436/63 |
| 5,467,165 | 11/1995 | Jacob et al. | 355/71 |
| 5,621,502 | 4/1997 | Bronaugh et al. | 355/79 |
| 5,638,153 | 6/1997 | Zahn et al. | 355/35 |

FOREIGN PATENT DOCUMENTS 40 40 498 A1   6/1992   Germany .

*Primary Examiner*—Safet Metjahic
*Assistant Examiner*—Peter Kim
*Attorney, Agent, or Firm*—Darby & Darby

[57] ABSTRACT

A master to be copied has a picture in which a dark region and a light region are located one behind the other. The two regions are separated by a light/dark transition where a halo can develop on copies of the master. Prior to copying, the master is scanned and the resulting data used to produce a mask for the master. The mask has a light/dark transition corresponding to the light/dark transition of the master. However, the light/dark transition of the mask is shifted relative to the light/dark transition of the master. The shift is such that, when the mask is superimposed on the master, the light/dark transition of the mask is superimposed on a region of the master which reduces the visibility of the halo. The master is copied following masking.

25 Claims, 3 Drawing Sheets

METHOD OF REPRODUCING TRANSPARENT MASTERS

BACKGROUND OF THE INVENTION

The invention relates to the reproduction of masters or originals.

Masters or originals in the form of photographs frequently exhibit large variations in brightness. Paper copies or prints of such masters are overexposed in the light areas or underexposed in the dark areas. As a result, details and fine structures are poorly visible, or no longer visible, in the copies.

To improve the quality of a copy made from a master with large variations in brightness, the German Patent Publication No. 40 40 498 proposes to mask the master with an unsharp mask. The unsharp mask reduces the overall contrast while providing greater contrast for the details. This is different from a sharp mask which makes the edges sharper but decreases the contrast for the details. The German Patent Publication teaches a mask with very low resolution, i.e., a mask which produces a very unsharp image of the master.

It has been found that the method of the German Patent Publication normally yields outstanding results but that undesirable effects can occur with certain pictures. For instance, if a picture contains a dark scene against a background of medium density, the high degree of unsharpness of the mask can result in a very bright border which extends around the dark scene and blends into the background only at a relatively great distance from such scene. Due to its somewhat singular shape, this border is referred to as a "white halo". A corresponding "black halo" can arise around a bright scene set against a background of medium density.

SUMMARY OF THE INVENTION

It is an object of the invention to reduce the visibility of halos.

The preceding object, as well as others which will become apparent as the description proceeds, are achieved by the invention.

One aspect of the invention resides in a method of copying a master having a first light/dark transition. The method comprises the step of producing a mask having a second light/dark transition corresponding to the first transition. The producing step is performed in such a manner that, when the mask is superimposed on the master or on an image of the master, the light/dark transition of the mask is shifted relative to the light/dark transition of the master. The master is advantageously transparent while the mask is preferably unsharp.

Shifting of the light/dark transition of the mask relative to the light/dark transition of the master may be accomplished using a morphological filter.

If the master has a dark region, the step of producing the mask can be performed in such a manner that the light/dark transition of the mask is superimposed on the dark region of the master when the mask is superimposed on the master or on an image of the master. Here, the light/dark transition of the mask may be shifted relative to the light/dark transition of the master using a dilatation filter.

When the master has a light region, the mask can be produced in such a way that the light/dark transition of the mask is superimposed on the light region of the master when the mask is superimposed on the master or on an image of the master. In this case, shifting of the light/dark transition of the mask relative to the light/dark transition of the master may be accomplished using an erosion filter.

The method can further comprise the step of deriving data from the master. The derivation of data from the master may involve the operations of scanning the master, and generating data from the scanning operation. The mask can be produced using the data obtained from the master, and production of the mask may be performed in such a manner that shifting of the light/dark transition of the mask relative to the light/dark transition of the master occurs as a function of the data. The data derived from the master is preferably in the form of density values.

The data obtained from the master may include first values which differ from a predetermined value by at least a selected amount and correspond to a selected region of the master different from the light/dark transition. The data may further include second values which correspond to the remaining regions of the master and differ from the predetermined value by less than the selected amount. The step of producing the mask can here be performed in such a manner that the light/dark transition of the mask is superimposed on the selected region of the master when the mask is superimposed on the master or on an image of the master.

The mask can be produced by means of an electronic component.

The step of producing the mask may be carried out in such a manner that the mask is electronic. The method can then comprise the additional steps of generating an electronic image of the master, and electronically superimposing the mask on the electronic image.

Light/dark transitions are critical to an image and constitute locations where halos can appear. By shifting a light/dark transition of a mask relative to a master, this transition can be displaced to an area in which halos are less visible or even invisible.

Photographic copy paper has a much smaller dynamic range than photographic film. Therefore, intensity gradations present in a film are reproducible only to a limited extent on such copy paper. This implies that fine gradations are undetectable in areas of the copy paper which have been very highly exposed or exposed very little.

The invention makes it possible to take advantage of this phenomenon. Thus, by means of the invention, halos can be shifted to areas of photographic copy paper which have been very highly exposed or exposed very little so that the halos become invisible or virtually invisible.

White halos, which appear more frequently than black halos, occur when an image contains a dark foreground in combination with a background of medium density. In order to reduce the visibility of a white halo, the light/dark transition is advantageously shifted to a highly exposed area of the image, namely, to the dark foreground. To this end, dark regions of a mask must be reduced in size relative to the surrounding light regions.

On the other hand, a reduction in the visibility of a black halo requires that light regions of a mask be reduced in size with respect to the surrounding dark regions.

To produce a mask for a master, the master may be scanned at a series of points to generate density values for the various points. As mentioned previously, a morphological filter can be used to cause shifting of a light/dark transition, and such a filter may be designed so that a new density value is calculated for each scanned point on the basis of the densities of the surrounding points. This can be accomplished by considering each scanned point to be at the center of a point matrix in which every point is assigned a density value and the density values are listed in the order of their magnitudes.

When a median filter is employed, the new density value of a scanned point is the density value assigned to the center point of the associated matrix.

If an erosion filter is used, the new density value of a scanned point is the density value of the respective matrix which is a specified amount less than the density value of the matrix center point.

In the event that a dilatation filter is employed, the new density value of a scanned point is the density value of the corresponding matrix which is a predetermined amount more than the density value of the matrix center point.

According to one embodiment of the invention, a threshold-dependent dilatation filter may be used to reduce the visibility of a white halo. Here, the density value of each scanned point is compared with the smallest density value in the respective matrix. If the difference between the density values exceeds a predetermined threshold value, the dilatation filter is employed to change the density value for the respective scanned point. On the other hand, if the difference between the density value of a scanned point and the smallest density value in the corresponding matrix is less than or equal to the threshold value, the density value for the scanned point remains unchanged.

In accordance with another embodiment of the invention, a threshold-dependent erosion filter can be employed to reduce the visibility of a halo. In this case, the density value of a scanned point is compared with the largest density value in the associated matrix, and the difference between the density values is then compared with an additional predetermined threshold value. Depending upon the results of the comparison, the erosion filter may or may not be used to effect a change in density value. The erosion filter can be used in combination with a threshold-dependent dilatation filter.

Since individual scanned points are handled very differently, a light/dark transition does not necessarily undergo a simple displacement when utilizing a combination of a threshold-dependent dilatation filter and a threshold-dependent erosion filter. Rather, a light/dark transition which is well-defined in and of itself may fan out radially and become unsharp. Nevertheless, when viewed overall, a shift of the light/dark transition will be observable.

Additional features and advantages of the invention will be forthcoming from the following detailed description of preferred embodiments when read in conjunction with the accompanying drawings.

DESCRIPTION OF THE PREFERRED EMBODIMENTS

Figure 1:
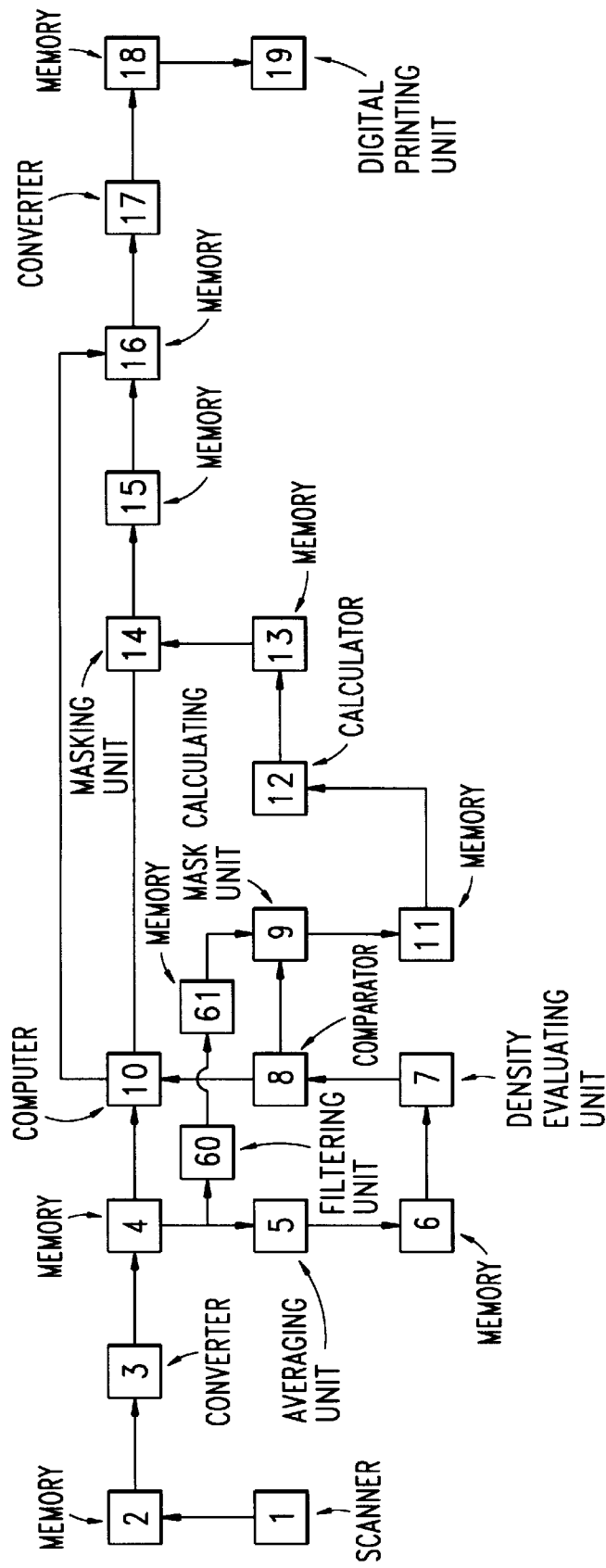
FIG. 1 is a block diagram of one embodiment of a copying apparatus.

FIG. 1 illustrates a digital copying apparatus or printer for making copies or prints of transparent masters. The masters, which can be negatives or diapositives, may constitute the frames of films.

The apparatus includes a scanner 1 which can, for instance, include a linear array of CCDs. The scanner 1 is designed to scan each master at a multiplicity of points arranged in lines and rows, and scanning is carried out at high resolution. By way of example, a frame of a conventional 135 mm film is scanned along lines and rows at a resolution of 2000 points×3000 points. At every point, density values are generated for each of the primary colors red, green and blue.

If scanning is performed at 8 bits, 256 degrees of luminosity with luminosity values of 0 thru 255 are obtained for each point and each primary color. To avoid undefined expressions in subsequent calculations, the luminosity value of 0 is increased to 1 so that 255 degrees of luminosity remain for each color and each point.

The values generated during scanning are entered in a memory 2. Red, green and blue signals are retrieved from the memory 2 and sent to a converter 3 which converts these color signals into two chrominance signals and a luminance signal. The chrominance and luminance signals are stored in a memory 4 as sharp chrominance and luminance images.

The luminance image corresponding to a master is used to determine the magnitude of the density variation in the master and whether masking would have a positive effect on a copy or print of the master. The magnitude of the density variation should not be established by comparing the brightest point of the master with the darkest point. For example, this would cause a master with a serene scene containing small, very bright points representing stars, lights or reflections from a body of water to be masked with a resultant loss in brilliance. Accordingly, the density differences between large areas should be examined.

To this end, an averaging unit 5 calculates a floating average over the points of the luminance image stored in the memory 4. Assuming that the points of the luminance image are stored as a two-dimensional matrix in which the points are assigned intensity values $y_{i,j}$ representing $y_{1,1}$, $y_{1,2}$ ... and $y_{2,1}$, $y_{2,2}$ ... , the averaging unit 5 calculates new intensity values $y'_{i,j}$ as follows:

$$y'_{i,j} = \frac{1}{(2m+1)^2} \sum_{k=i-m}^{k=i+m} \sum_{l=j-m}^{l=j+m} y_{k,l}$$

The square of the factor (2m+1) represents the number of points over which averaging is performed. For a scanning resolution of 2000 points×3000 points, good results are obtained when m=40.

The averaging operation yields an unsharp luminance image whose points have intensity values $y'_{i,j}$, and the values $y'_{i,j}$ are entered in a memory 6. The brightest and darkest points of the unsharp luminance image are determined in a density evaluating unit 7. If the intensity value associated with the brightest point is $y'_b$ and the intensity value associated with the darkest point is $y'_d$, the ratio $y'_b/y'_d$ is a measure of the contrast of the unsharp luminance image. This quotient is compared with a reference value K in a comparator 8. The reference value K represents a boundary beyond which a master should be masked. The reference value K is a function of the number m which, as indicated above, is a measure of the number of points used for averaging. When m=40, a suitable value for K is 7.

If the contrast of the unsharp luminance image, as represented by the quotient $y'_b/y'_d$, is found to be smaller than 7, the comparator 8 decides that the master is to be copied unmasked, and this information is transmitted to a computer 10. On the other hand, should the contrast be equal to or greater than 7, a mask must be produced from the available data on the master.

Should it be necessary to produce a mask, the luminance image in the memory 4 is sent to a filtering unit 60 where the luminance image undergoes dilation by operating on it with a threshold-dependent dilatation filter. In the filtering unit 60, the intensity value $y_{i,j}$ for each point of the luminance image is considered to be part of a matrix of intensity values $y_{k,l}$ where:

k ranges from i−r to i+r; and l ranges from j−r to j+r.

Advantageously, r is set equal to 3.

For each point of the luminance image, the largest intensity value $y_{k,l\ max}$ of the corresponding matrix is determined. The difference between this intensity value and that of the respective luminance image point is calculated and compared with a threshold value S. If the difference is less than or equal to the threshold value S, the intensity value of the luminance image point is not changed. Should the difference exceed the threshold value S, the intensity value of the luminance image point is set equal to the maximum intensity value $y_{k,l\ max}$ of the respective matrix If $y''_{i,j}$ represents the intensity value assigned to the luminance image point after the difference between the maximum intensity value $y_{k,l\ max}$ and the original intensity value of the point has been compared to the threshold value S, then:

$y''_{i,j}=y_{i,j}$ when $y_{i,j}-y_{k,l\ max}$ is less than or equal to S; and $y''_{i,j}=y_{k,l\ max}$ when $y_{i,j}-y_{k,l\ max}$ is greater than S.

Good results are obtained with a threshold value S=100.

The intensity values $y''_{i,j}$ are stored in a memory 61.

The dilatation described above may be employed when a master has a light/dark transition which can result in a halo on a print or copy of the master. The dilatation causes the light/dark transition to be displaced so that, on the mask being produced, the light/dark transition is shifted relative to the light/dark transition on the master. A dilatation filter is particularly useful where a light/dark transition produces a white halo. Under these circumstances, a dilatation filter can be employed to shift the light/dark transition in such a manner that, when the mask is superimposed on the master or on an image of the master, the light/dark transition is superimposed on a dark region of the master or its image. The halo then becomes invisible or almost so. The dark region on which the light/dark transition is superimposed may be the dark region which borders the light/dark transition.

It is also possible to subject the luminance image in the memory 4 to erosion by operating on the luminance image with a threshold-dependent erosion filter. The erosion is carried out analogously to the dilatation outlined earlier. However, for erosion, the smallest intensity value of a matrix is determined. The difference between this intensity value and that of the respective luminance image point is calculated and compared with a second threshold value. If the difference is less than the second threshold value, the intensity value of the luminance image point is set equal to the minimum intensity value $y_{k,l\ min}$ of the matrix.

Similarly to dilatation, erosion may be used when a master has a light/dark transition which can create a halo on a print or copy of a master. The erosion causes the light/dark transition to be displaced so that, on the mask being produced, the light/dark transition is shifted relative to the light/dark transition on the master. An erosion filter is especially advantageous where a light/dark transition produces a black halo. Here, an erosion filter can be employed to shift the light/dark transition in such a manner that, when the mask is superimposed on the master or on an image of the master, the light/dark transition is superimposed on a light region of the master or its image. The halo then becomes invisible or virtually invisible. The light region on which the light/dark transition is superimposed can be the light region which borders the light/dark transition.

It is possible to use a combination of a threshold-dependent dilatation filter and a threshold-dependent erosion filter.

The distance by which a light/dark transition on a mask is shifted relative to the corresponding light/dark transition on a master is a function of the intensity values or density values derived from the master by scanning. It is preferred for the light/dark transition on the mask to be displaced such that, when the mask is superimposed on the master or on an image of the master, the light/dark transition of the mask is superimposed on a region of the master whose intensity values or density values lie farthest from a predetermined value.

Assuming that the luminance image in the memory 4 is to be masked, a raw mask is now calculated in a mask calculating unit 9. The raw mask is in the form of a set of intensity values $y'''_{i,j}$ which, like the intensity values $y'_{i,j}$ for the unsharp luminance image, are calculated using floating averages. The calculating unit 9 calculates the raw mask as follows:

$$y'''_{i,j} = \frac{1}{(2n+1)^2} \sum_{k=i-n}^{k=i+n} \sum_{l=j-n}^{l=j+n} y''_{k,l}$$

The raw mask derived in the calculating unit 9 constitutes a second unsharp luminance image. The square of the term (2n+1) represents the number of points over which averaging is carried out. When m=40 and K=7, a value of n=50 has been found satisfactory.

The intensity values $y'''_{i,j}$ for the raw mask are entered in a memory 11. Since the purpose of masking is to brighten areas of a master which are too dark and to darken areas of a master which are too bright, the mask must be the inverse of the master. Hence, the raw mask stored in the memory 11 must be inverted. Moreover, the mask should be designed so that the brightest point of the mask causes no darkening of the master. To this end, the mask must be normalized. Furthermore, the gradation or gamma of the mask is to be taken into account.

The inversion, normalization and gradation adjustment of the mask are performed in a calculator 12 using a single calculation. The calculator 12 calculates the intensity values $y^{IV}_{i,j}$ for the points of the final mask as follows:

$$y^{IV}_{i,j} = 255 \left( \frac{y'''_d}{y'''_{i,j}} \right)^{\gamma}$$

In the preceding equation, $y'''_d$ represents the intensity value for the darkest point of the raw mask stored in the memory 11 while gamma represents a gradation factor. A gradation factor of 0.5 has been found to work very well when m=40, n=50, r=3, K=7 and S=100. The intensity values $Y^{IV}_{i,j}$ for the final mask are entered in a memory 13.

The original sharp luminance image stored in the memory 4 is corrected in the computer 10 if necessary. The final mask stored in the memory 13 is thereupon superimposed on the original luminance image in a masking unit 14. To this end, the intensity value for each point of the original luminance image is multiplied by the intensity value for the corresponding point of the final mask in the memory 13. The product is divided by 255, which constitutes the largest degree of luminosity, and the resulting value is multiplied by a term which effects an adjustment of scale and returns the intensity value of the brightest point of the master to the range of values in which it was originally located. These operations, which are performed by the masking unit 14 and yield intensity values $y^V_{i,j}$ representing the masked luminance image, are expressed mathematically as follows:

$$y^V_{i,j} = \frac{y_{i,j} y'^V_{i,j}}{255} \left(\frac{255}{y'''_d}\right)^\gamma$$

The intensity values $y^V_{i,j}$ for the masked luminance image are entered in a memory 15.

To produce a copy of the master associated with the masked luminance image, this image must be united with the two chrominance images derived from the master. A memory 16 of the same type as the memory 4 is provided for this purpose.

As mentioned previously, the original sharp luminance image stored in the memory 4 is corrected in the computer 10 if necessary. The same is true for the two chrominance images stored in the memory 4.

If the comparator 8 determines that the master is to be copied unmasked, the two chrominance images, as well as the original sharp luminance image, are sent from the computer 10 directly to the memory 16. On the other hand, if the comparator 8 determines that the master is to be masked during copying, the computer 10 transmits only the two chrominance images to the memory 16. Instead of the original sharp luminance image, the memory 16 here receives the masked luminance image from the memory 15.

A converter 17 transforms the chrominance and luminance images stored in the memory 16 into red, green and blue signals which are entered in a memory 18 of the same type as the memory 2. The red, green and blue signals are sent to a digital copying or printing unit 19 which uses the signals to make a copy of the master on copy material, e.g., conventional CN paper.

The procedure described above assumes that the master is a negative. Should the master be a diapositive, the signals which drive the copying unit 19 must additionally be inverted in a known manner.

Figure 2:
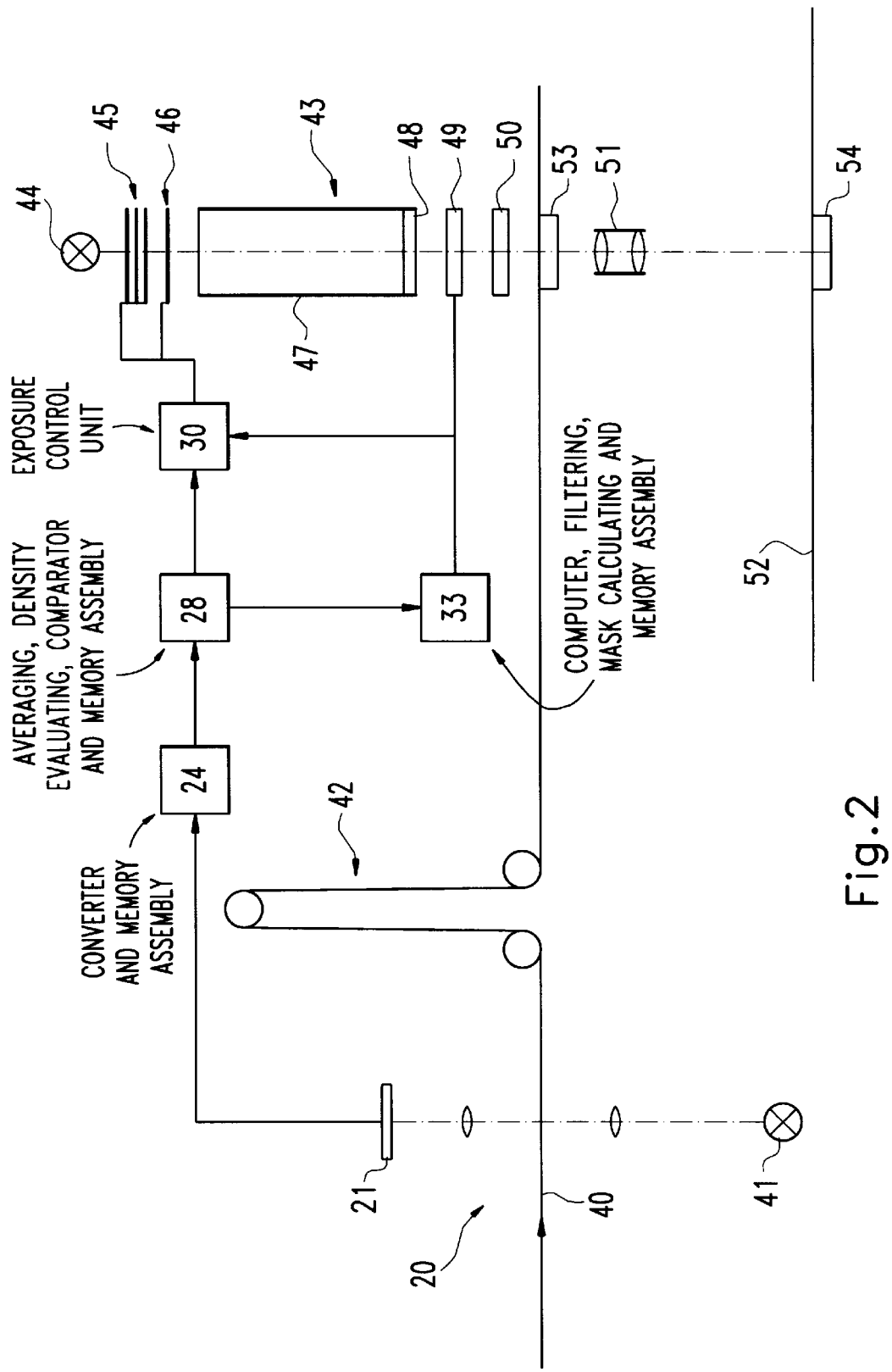
FIG. 2 schematically illustrates another embodiment of a copying apparatus.

The apparatus of FIG. 1 is a digital copying or printing apparatus. FIG. 2 shows a copying or printing apparatus which, in contrast, operates with conventional direct or integral illumination of masters.

Referring to FIG. 2, an exposed and developed transparent film 40 is transported from left to right. The film 40 first passes through a scanner 20 having a light source or illumination source 41 and a sensor 21. The sensor 21 may, for example, be constituted by a two-dimensional or linear array of CCDs. The scanner 20 can have a substantially lower resolution than the scanner 1 of FIG. 1, e.g., a resolution of 400 pixels=600 pixels.

Downstream of the scanner 20, the film 40 forms a loop 42 of variable length. The loop 42 serves as a temporary storage device which allows at least the major part of the film 40 to be scanned before the leading frame of the film 40 enters a copying station 43. Furthermore, the film 40 travels through the scanner 20 continuously and through the copying station 43 in steps, and the loop 42 further serves as a buffer which compensates for the different rates of movement of the film 40 through the scanner 20 and the copying station 43.

The copying station 43 has a platform or support 53 on which a frame of the film 40 rests while being copied. The copying station 43 is also provided with a platform or support 54 for a section of copy material 52. During copying, an image of the frame on the platform 53 is projected onto the section of copy material 52 overlying the platform 54.

In order to project an image of a frame onto the copy material 52, the frame is illuminated by a lamp or illumination source 44. Between the lamp 44 and the platform 53 are a set of color filters 45, a shutter 46, a reflecting tube 47, an LCD display 49 and a diffusing disk 50. The end of the reflecting tube 47 facing the lamp 44 has an opening for the admission of light into the tube 47. The opposite end of the reflecting tube 47, which faces the platform 53, has an opening for the discharge of light from the tube 47. A second diffusing disk 48 is mounted in the discharge opening of the reflecting tube 47.

Light which travels from the lamp 44 to a frame on the platform 53 passes through the frame to an objective 51. The objective 51 focuses an image of the frame on the section of copy material 52 which rests on the platform 54.

The LCD display 49 is used to generate an unsharp mask for frames having too high a large-area contrast, that is, frames in which the contrast of larger areas is excessive. As opposed to the apparatus of FIG. 1, the unsharp mask of the LCD display 49 is optically superimposed on a frame to be masked.

Calculation of the mask is performed analogously to FIG. 1. An assembly 24 in FIG. 2 contains a converter and two memories which correspond to the converter 3 and memories 2,4 of FIG. 1 while an assembly 28 includes an averaging unit, a memory, a density evaluating unit and a comparator which correspond to the averaging unit 5, the memory 6, the density evaluating unit 7 and the comparator 8 of FIG. 1. A third assembly 33 in FIG. 2 comprises a filtering unit, a mask calculating unit, a computer, a calculator and three memories corresponding to the filtering unit 60, the mask calculating unit 9, the computer 10, the calculator 12 and the memories 11,13,61 of FIG. 1.

The assembly 33 is connected to the LCD display 49, and the mask calculated by the assembly 33 is generated in the display 49 under the direction of the assembly 33. The assembly 33 is also connected to an exposure control unit 30 which adjusts the color filters 45 and the shutter 46 in a conventional manner taking the mask into account.

To produce copies or prints which are qualitatively of high quality, the various components of a copying or printing apparatus must be properly matched to one another. For the apparatus of FIG. 1, this condition can be fulfilled by setting m equal to 40, K equal to 7, n equal to 50 and gamma equal to 0.5 as described earlier.

Assuming that copies having a size of 9 cm×13 cm are to be made from a conventional film of small format, two exemplary configurations which satisfy the preceding condition for the apparatus of FIG. 2 are as follows:

EXAMPLE 1

A mask is calculated using a value of 8 for m, a value of 7 for K, a value of 10 for n, and a value of 0.5 for gamma. The LCD display has 15,000 individually controllable points which can assume different shades of gray. The shade of gray for each point is established by averaging 16 intensity values. The distance between the film 40 and the mask generated in the LCD display is 10.5 mm. The diffusing disks 48 and 50 consist of glass plates, and one surface of each disk 48,50 is given a matte finish by grinding with silicon carbide having a particle size of 1000. The ground surface of the diffusing disk 50 is located at a distance of 2.5 mm from the film 40 while the ground surface of the diffusing disk 48 is located at a distance of 15 mm from the film 40. The distance between the film 40 and the copy material 52 is 555 mm. The objective 51 has a relative aperture of $\frac{1}{4.5}$ and is set to a magnification of 3.9.

EXAMPLE 2

The mask is calculated and formed as in Example 1 but the distance between the mask and the film 40 is 15 mm. The diffusing disks 48 and 50 each have an etched surface rather than a ground surface, and the etched surface of the disk 50 is located at a distance of 7 mm from the film 40 while the etched surface of the disk 48 is located at a distance of 22 mm from the film 40. The objective 51 has a relative aperture of ¼.5.

Figure 3A:
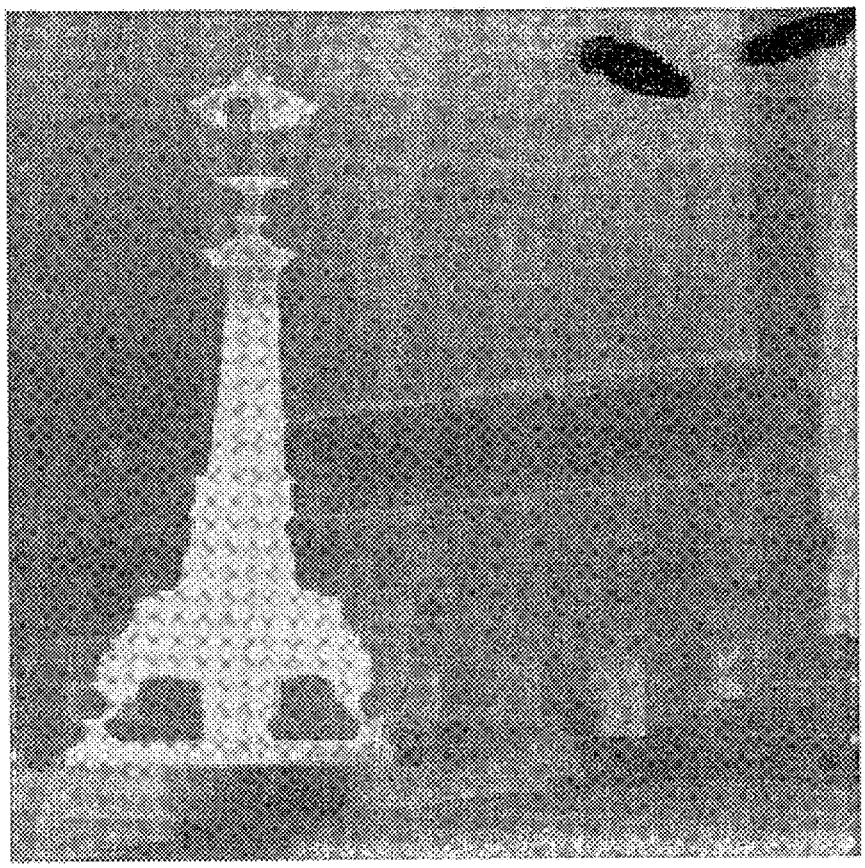
FIGS. 3a and 3b show respective prints which were produced using different dilatation filters.

FIG. 3*a* shows a negative or master which has been operated on by a simple dilatation filter, that is, a dilatation filter which is not threshold-dependent. The light regions such as, for instance, the lamp in the foreground, are reduced in size with respect to the unfiltered negative. On the other hand, the dark regions, e.g., the cloud in the upper right-hand corner, are enlarged relative to the unfiltered negative. The simple dilatation filter allows the visibility of white halos to be decreased. However, for certain pictures, black halos can become more intense.

Figure 3B:
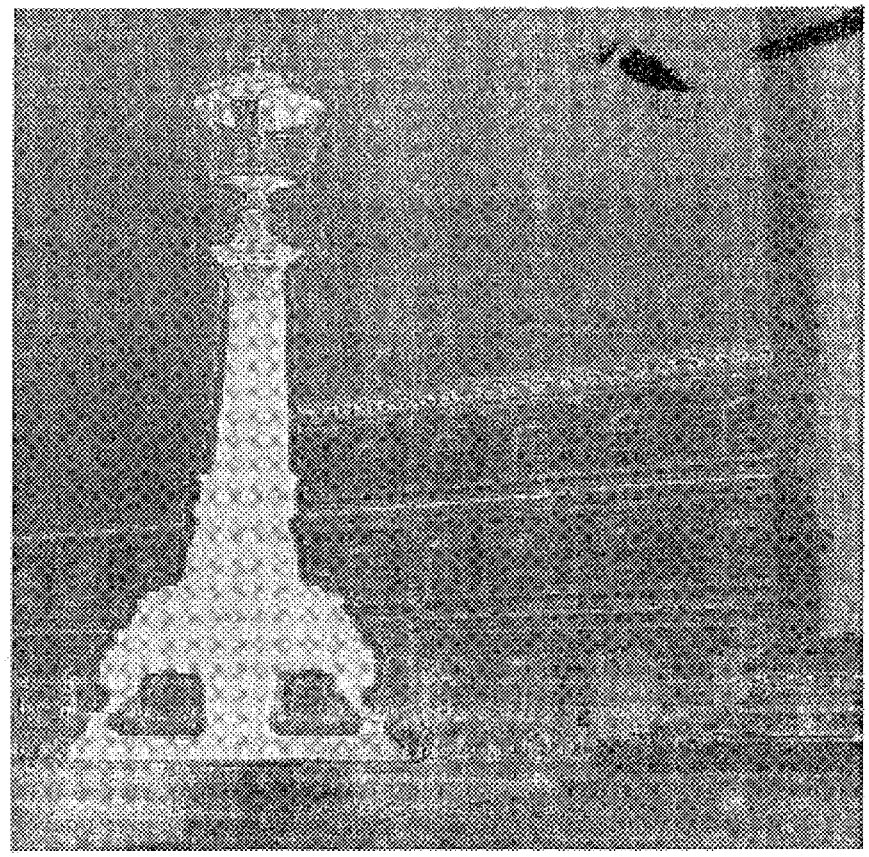

FIG. 3*b* illustrates the negative of FIG. 3*a* after the negative has been operated on by a threshold-dependent dilatation filter. Similarly to FIG. 3*a*, the light regions are reduced in size relative to the unfiltered negative. On the other hand, in contrast to FIG. 3*a*, the dark regions such as the cloud in the upper right-hand corner are not enlarged with respect to the unfiltered negative. Accordingly, like the simple dilatation filter, the threshold-dependent dilatation filter permits the visibility of white halos to be reduced. Contrary to the simple dilatation filter, however, the much less frequent black halos at least are not intensified when using the threshold-dependent dilatation filter.

Various modifications are possible within the meaning and range of equivalence of the appended claims.

We claim:

1. A method of producing a picture image from a transparent master having light/dark transitions, comprising the steps of:
    scanning the transparent master and determining density of the master;
    producing an unsharp mask from the determined density values having light/dark transitions; and
    superimposing the unsharp mask onto the transparent master so that the light/dark transitions of the unsharp mask are shifted relative to the light/dark transitions of the master.

2. The method of claim 1, wherein in the producing step the shifting relative to the light/dark transitions is accomplished using a morphological filter.

3. The method of claim 1, further comprising the step of shifting the light/dark transitions of the mask into a dark region of the light/dark transitions of the picture image.

4. The method of claim 1, further comprising the step of shifting the light/dark transitions of the mask into a light region of the light/dark transitions of the picture image.

5. The method of claim 3, wherein the shifting of the light/dark transitions is accomplished using a dilatation filter.

6. The method of claim 4, wherein the shifting of the light/dark transitions is accomplished using an erosion filter.

7. The method of claim 1, wherein the producing step comprises forming said mask with an electronic component.

8. The method of claim 1, wherein the mask produced is an electronic mask; and further comprising the steps of generating an electronic image of the transparent master, and electronically superimposing the transparent mask on said electronic image.

9. The method of claim 1, further comprising the step of deriving data from the transparent master; and wherein in the producing step the derived data are utilized for the shifting of the light/dark transitions of the mask relative to the light/dark transitions of the master.

10. The method of claim 9, wherein the data includes first values which differ from a predetermined value by at least a selected amount and second values which differ from the predetermined value by less than the selected amount, the first values corresponding to a selected region of the transparent master different from light/dark transitions of the transparent master, and the second values corresponding to the remaining regions of the transparent master, the producing step being performed in that the light/dark transitions of the mask are superimposed on the selected region when said mask is superimposed on the transparent master or on an image of the transparent master.

11. The method of claim 1, wherein in the producing step the light/dark transitions of the unsharp mask correspond to the light/dark transitions of the transparent master.

12. A method of producing a picture image from a transparent master having a light/dark transition, comprising the steps of:
    scanning the transparent master to generate density values; and
    producing an unsharp mask having a light/dark transition based on the scanned density values of the transparent master so that when the unsharp mask is superimposed onto the transparent master, the light/dark transition of the unsharp mask is shifted relative to the light/dark transition of the master.

13. The method of claim 12, wherein in the producing step when the unsharp mask and the master are superimposed, the light/dark transition of the unsharp mask is shifted into a dark region of the light/dark transition of the picture image.

14. The method of claim 12, wherein in the producing step when the unsharp mask and the master are superimposed, the light/dark transition of the unsharp mask is shifted into a light region of the light/dark transition of the picture image.

15. The method of claim 12, wherein in the producing step when the unsharp mask and the master are superimposed, the light/dark transition of the unsharp mask is shifted relative to the light/dark transition of the master using a morphological filter.

16. The method of claim 12, wherein in the producing step when the unsharp mask and the master are superimposed, the light/dark transition of the unsharp mask is shifted relative to the light/dark transition of the master using a dilatation filter.

17. The method of claim 12, wherein in the producing step when the unsharp mask and the master are superimposed, the light/dark transition of the unsharp mask is shifted relative to the light/dark transition of the master using an erosion filter.

18. The method of claim 12, further comprising the step of deriving data from the transparent master.

19. The method of claim 18, wherein in the producing step when the unsharp mask and the master are superimposed, the shift of the light/dark transition of the unsharp mask relative to the light/dark transition of the master is a function of the derived data.

20. The method of claim 19, the deriving data includes first values different from a predetermined value by at least a selected amount and second values different from the predetermined value by less than the selected amount, the first values corresponding to a selected region of the transparent master different from the light/dark transition of the transparent master, and the second values corresponding to the remaining regions of the transparent master.

21. The method of claim 20, wherein in the producing step the light/dark transition of the unsharp mask is superimposed on the selected region when the unsharp mask is superimposed on the transparent master.

22. The method of claim 12, wherein the producing step comprises forming the unsharp mask using an electronic component.

23. The method of claim 12, wherein the unsharp mask is an electronic mask.

24. The method of claim 23, wherein the producing step comprises generating an electronic image of the transparent master and electronically superimposing the electronic mask on the electronic image.

25. The method of claim 12, wherein in the producing step the light/dark transitions of the unsharp mask correspond to the light/dark transitions of the transparent master.

* * * * *